United States Patent [19]
Dunn et al.

[11] Patent Number: 5,495,528
[45] Date of Patent: Feb. 27, 1996

[54] DIGITAL TELEPHONE CONTROL INTERFACE SYSTEM

[75] Inventors: Tave P. Dunn; Elie A. Jreij, both of Austin, Tex.; Jack D. Collins, Coral Springs, Fla.; Michael J. Horowitz, Ann Arbor, Mich.

[73] Assignee: Rolm Systems, Santa Clara, Calif.

[21] Appl. No.: 348,287

[22] Filed: Nov. 30, 1994

Related U.S. Application Data

[63] Continuation of Ser. No. 934,992, Aug. 25, 1992, abandoned.

[51] Int. Cl.⁶ .................................................. H04M 1/00
[52] U.S. Cl. ........................................ 379/387; 379/200
[58] Field of Search .................................... 379/387, 355, 379/356, 199, 200, 196, 197, 198; 341/22

[56] References Cited

U.S. PATENT DOCUMENTS

| | | | |
|---|---|---|---|
| 4,578,540 | 3/1986 | Borg et al. | 379/40 |
| 4,720,853 | 1/1988 | Szlam | 379/211 |
| 4,860,339 | 8/1989 | D'Agosto, III et al. | 379/355 X |
| 4,903,289 | 2/1990 | Hashimoto | 379/61 |
| 4,953,202 | 8/1990 | Newell | 379/200 |
| 5,109,408 | 4/1992 | Greenspan et al. | 379/197 |

FOREIGN PATENT DOCUMENTS

| | | | |
|---|---|---|---|
| 196140 | 8/1988 | Japan | 379/387 |

*Primary Examiner*—Carl D. Friedman
*Assistant Examiner*—Creighton Smith

[57] ABSTRACT

The present invention is a digital telephone control interface system that provides a programmable control to the keys of a digital feature telephone. The programmable control selectively masks the keys present on a telephone and prevents masked keys from being directly responded to by the telephone or routed to the telephone switching network. While the keys are masked, the programmable control can suppress, delay, modify or enhance the key events produced by the masked keys as directed by the application software being run by the programmable control.

20 Claims, 2 Drawing Sheets

DIGITAL TELEPHONE CONTROL INTERFACE SYSTEM

CROSS-REFERENCE TO RELATED APPLICATION

This is a continuation of Ser. No. 07/934,992 filed on Aug. 25, 1992, abandoned.

FIELD OF THE INVENTION

The present invention relates to a telephone control interface system for use with digital feature telephones (DFTs) that are coupled to a programmable computer control, and more particularly to such telephone control interfaces that selectively mask, monitor, supplement and route the key depressions at the DFT as directed by the computer control.

BACKGROUND OF THE INVENTION

Along with the recent advancements in telecommunications has come a corresponding complexity exhibited by modern telephone systems and the digital telephones associated with such systems. Many digital feature telephones (DFTs) are no longer limited in their operations to merely receive and transmit telephone messages. Rather, many DFTs contain both logic and memory circuits that allow the DFTs to perform preprogrammed functions. For example, many DFTs are capable of storing commonly dialed telephone numbers within a memory, whereby a telephone number held in memory can be recalled from the memory and forwarded to a telephone switching exchange by a single key depression.

Aside from DFTs containing dedicated logic circuitry within their construction, the prior art is replete with telephone systems wherein a host computer or computer control is coupled to a telephone subset. In the early prior art, telephones and computers worked independently. However, in an attempt to improve both productivity and efficiency, application programming interfaces (API) have been developed that permit the direct intercoupling and intercommunication of telephones and computers. In prior art APIs, although the computer and telephone directly communicate, the computer was not allotted full control over the operation of the telephone. Rather, many prior art API's merely provided a means for a host computer to assist in the operation of the telephone by performing such functions as dialing, answering calls, or keeping track of the status of the telephone. In such prior art APIs, since the host computer was not provided with full control over the operations of the telephone, the computer could not prevent a wrongful or inadvertent key entry from being processed. As a consequence, prior art APIs merely permitted a host computer to react to the changing status of the telephone. As such, if the wrongful key entry altered the status of the telephone the host computer would react to the wrongful key entry. By reacting to a wrongful key entry, the program application being run by the host computer could be disrupted, aborted or otherwise misdirected.

Wrongful key events may be inadvertently entered into a telephone system when a novice user is first trained in how to properly utilize the system. In many telephone systems, it is not uncommon for telephones to have specialized keys that perform various desirable functions such as the storage and retrieval of commonly used numbers from memory, the transfer of a phone call from one telephone to another, the interconnecting of telephones for conference calls, placing a caller on hold, and so on. In fact, many telephone systems now utilize DFTs that are so complex in their function, that the purpose of the keys on the telephone keypad are no longer self evident. Consequently, instructions and/or training is required to learn how to properly utilize all the features available within the telephone system.

Most telephone systems and telephones are furnished with a manual of operating instructions. In many prior art systems, it was only by reading and memorizing the operating instructions that a person become proficient in the proper use of the telephone system. The problem with most operating manuals is that operating manuals are not dynamic, but rather only contain text and occasionally illustrations. As such, the user's only opportunity to actually try and operate the functions of a telephone system is to press the various function keys of a telephone in accordance with the instructions of the operating manual and thereby dynamically learn the features of the telephone system by trial and error. The obvious disadvantages of dynamically learning the features of a telephone system by trial and error, are that errors will inevitably occur. When applied to an actual operating telephone system, such errors may not be isolated to the features of the telephone subset but may be forwarded to the telephone switching exchange where they burden the switching exchange.

In view of the above, there exists a need for a telephone control interface system wherein a computer is given full control over the key events entered on a telephone within a given telephone system to prevent wrongful key events from being directed to the telephone switching system or disrupting a running computer application.

It is, therefore, a primary objective of the present invention to provide a telephone control interface system that interconnects a computer control to both the telephone and the telephone switching exchange of a telephone system, wherein the present invention control interface system provides the computer control with complete control over the keypad functions of the telephone.

SUMMARY OF THE INVENTION

The present invention is a digital telephone control interface system for selectively providing a computer control to a digital feature telephone and the corresponding method of masking selected keys on the digital feature telephone with the computer control. The present invention digital telephone control interface system interconnects a programmable central processing unit (CPU) or host computer to an existing telephone system, wherein at least one digital feature telephone is coupled to a telephone switching network. The CPU selectively masks keys present on the digital feature telephone in accordance with the application software being run by the CPU. Once selected keys are masked, key events generated by a person's utilization of the masked keys are not directly acted upon by the digital feature telephone or the telephone switching network. Rather, key events from masked keys are received, and responded to, solely by the CPU.

Masked key events received by the CPU are under the sole control of the CPU and can be manipulated in any manner as directed by the software application being run by the CPU. Under the direction of the running software application, the CPU may suppress a key event if a wrongful key event is entered by a user, thereby preventing that key event from being responded to by the telephone system. Additionally, the CPU may delay, alter or enhance the key events entered, adding to the efficiency at which a user may utilize the telephone system.

In addition to controlling the key events generated from masked key, the CPU may also dynamically interact with user operation of the telephone system so as to assist the user in performing a desired operation. For instance, many digital feature telephones include light emitting diodes (LEDs) that correspond to specific function keys on the telephone keypad. If the application software being run by the CPU masks such a function key, the CPU is provided with full control over the LEDs that correspond to the masked function keys. Hence, the LED may be caused to blink or be pulsed according to CPU control. Similarly, if the digital feature telephone includes a liquid crystal display (LCD), the CPU may be provided with the control of the LCD. The CPU also may be coupled to a video display monitor such as a computer screen. By selectively controlling the LEDs or the video display monitor, or the LCD, the CPU can employ desired responses sufficient to accommodate the typical situations encountered in use of the telephone system. As such, the CPU may dynamically instruct or assist a user in performing desired operations within the telephone system.

BRIEF DESCRIPTION OF THE FIGURES

For a better understanding of the present invention, reference is made to the following description of an exemplary embodiment thereof, considered in conjunction with the accompanying drawings, in which.

DETAILED DESCRIPTION OF THE DRAWINGS

Figure 1:
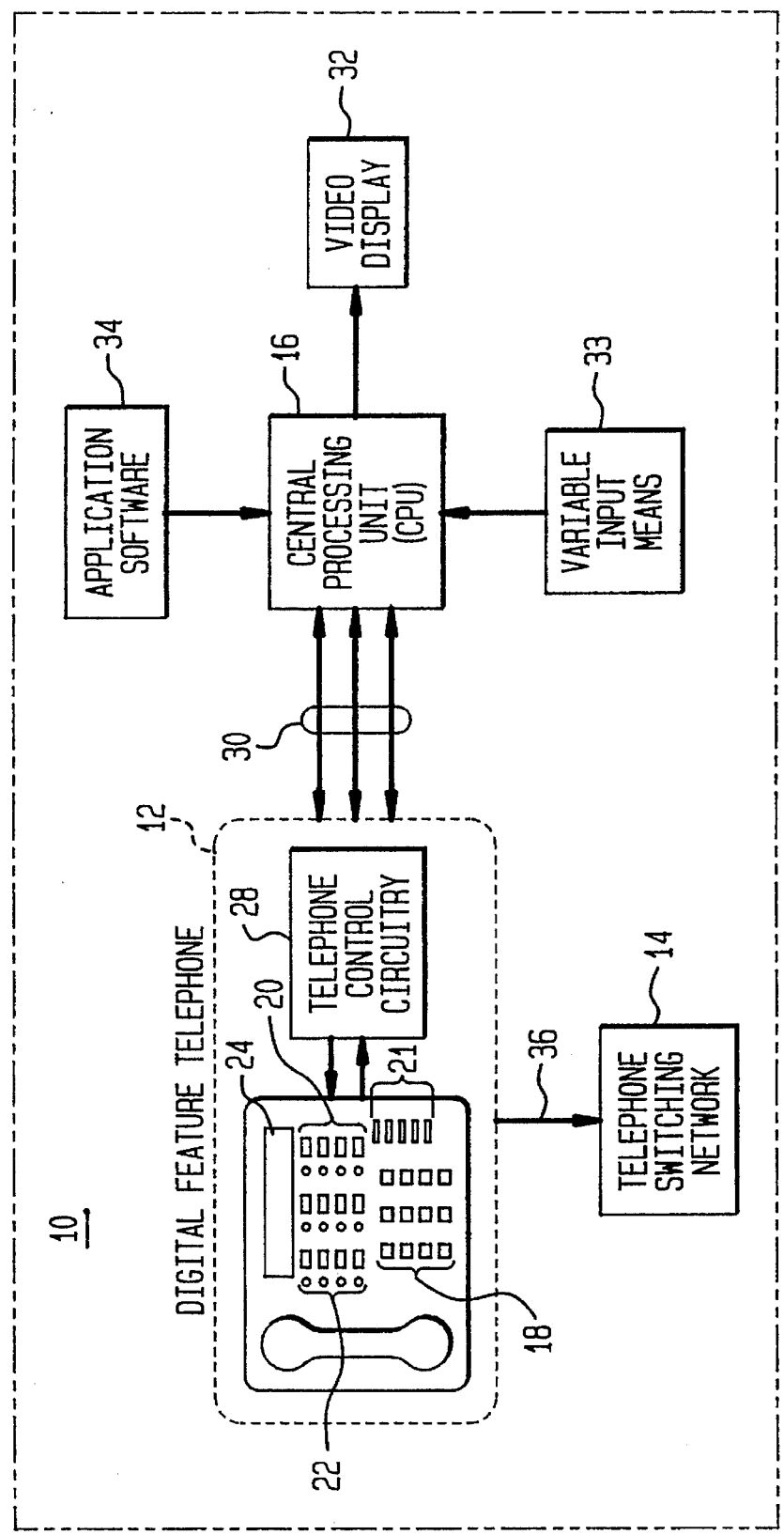
FIG. 1 is a block diagram of one exemplary embodiment of the present invention telephone control interface system shown in conjunction with a digital feature telephone.

Referring to FIG. 1, there is shown an exemplary embodiment of present invention digital telephone control interface system 10, wherein the response of a digital feature telephone (DFT) 12 to key events, and the communications between DFT 12 and a telephone switching network 14, are selectively controlled by a programmable central processing unit (CPU) 16. DFT 12 includes a standard twelve key keypad 18 typical of conventional digital feature telephones. In addition to keypad keys 18, DFT 12 also includes multiple function keys 20 that are dedicated in their operation to control the various preprogrammed features available through the DFT 12. The function keys 20 may control such preprogrammed features as retrieving and storing numbers from memory, transferring calls between DFTs, placing a call on hold or any other known function that may be found in a conventional DFT. Furthermore, other specialized keys 21 that may control such features as the volume of DFT 12 may also be present on the face of DFT 12. Light emitting diodes (LEDs) 22 or similar display devices may also be present on DFT 12. LEDs 22 preferably correspond to function keys 20 to provide a visual indication as to the status of the various function keys 20. However, it should be understood that certain keypad keys 18 or specialized keys 21 may also have corresponding LEDs 22. In the shown embodiment, DFT 12 also includes a liquid crystal display (LCD) 24 or other display. As is well known in the art, an LCD 24 on a DFT 12 can be used to display various information to a user of DFT 12, such as visually displaying the numbers entered via keypad keys 18, time elapsed during a call, date, and other common information.

The features controlled by function keys 20, as well as the operation of LEDs 22 and LCD 24 are controlled within DFT 12 by telephone control circuitry 28. As will be recognized by a person skilled in the art, the telephone control circuitry 28 contains both the logic and memory circuits needed to support the specific features contained within DFT 12. Conventionally, such telephone control circuitry 28 is associated with the telephone subset where it may be contained within the housing that defines DFT 12 or may be separately housed adjacent to DFT 12.

CPU 16 can be any programmable microprocessor. It should therefore be understood that CPU 16 may be a dedicated unit, such as a personal computer (PC), or CPU 16 may include circuitry contained within DFT 12 itself. In the preferred embodiment, CPU 16 is a personal computer that is separate from the DFT 12. As such, a communications link 30 capable of transmitting digital data is employed to interconnect DFT 12 to CPU 16. Although any known communications link may be used, the preferred embodiment utilizes an RS-232 interconnection. Such a communications link is desirable in the preferred embodiment but would not be required in an alternate embodiment should CPU 16 be formed directly into DFT 12.

In the preferred embodiment, wherein CPU 16 is a personal computer, CPU 16 is coupled to a visual display 32 such as a CRT which is preferably the video monitor of the personal computer. As such, the video monitor could be used to display text and graphics to the user as generated by CPU 16. Additionally, a variable input means 33 such as a computer keyboard, dedicated touchpad, mouse or the like may be coupled to CPU 16 so CPU 16 may be accessed by an operator. In an alternative embodiment, where CPU 16 is contained within the circuitry of DFT 12, CPU 16 may utilize the LCD 24 of DFT 12 in place and stead of the computer video monitor. As such, text and graphics displayed by CPU 16 may be displayed on LCD 24. Similarly, in such an alternative embodiment, CPU 16 may be accessed by utilizing the keypads keys 18, function keys 20, and specialized keys 21 present on DFT 12 in place and stead of a separate variable input means 33.

DFT 12 is also coupled to a telephone switching network 14 via a phone line 36. Depending upon the application of the telephone system, the telephones switching network 14 may be a public access exchange or a private branch exchange. In conventional telephone systems, the phone line connection between a telephone and the telephone switching network allows the telephone to receive and generate calls or activate features within the systems network. In the present invention digital telephone interface system 10, the application software 34 run by CPU 16 selectively masks keypad keys 18, function keys 20 and specialized keys 21 on DFT 12. As will be subsequently explained, when a keypad key 18, function key 20 or specialized key 21 is masked by the application software 34 being run by CPU 16, a key event created by the depression of such a masked key is not directly acted upon by the telephone control circuitry 28 nor is such a key event directly transmitted to telephone switching network 14. Rather, if a key is masked by the application software 34 being run by CPU 16, a key event corresponding to such a masked key is directed solely to CPU 16, wherein CPU 16 may direct the key event to the telephone control circuitry 28 and/or telephone switching network 14 as determined by application software 34.

The masking of a keypad key 18, function key 20 or specialized key 21, is selectively controlled by the application program 34 being run by CPU 16. If a particular keypad key 18, function key 20 or specialized key 21 is not masked by the application program 34 being run by CPU 16, the key event generated by depression of such key is directly acted upon by the telephone control circuitry 28 of DFT 12, and/or directed to telephone switching network 14 in the conventional manner. Similarly, if CPU 16 were not enabled, no keypad 18, function key 20 or specialized key 21 would be masked and all resulting key events would be directly reacted to by the telephone control circuitry 28 of DFT 12 and the telephone switching network 14 in a conventional manner.

Application software 34 to be run by CPU 16 is selected depending upon the needs of a particular telephone system and the task to be performed by a user within. the telephone system. By masking selected key events from keypad keys 18, function keys 20 and specialized keys 21, CPU 16 responds to key events before they are responded to by the telephone control circuitry 28. This operation prevents the key event from being forwarded to the telephone exchange network 14. Under the direction of application software 34, CPU 16 can ignore a key event, delay a key event, enhance a key event, alter a key event and/or dynamically interact with DFT 12 as a result of the key event so as to instruct or assist the user in an operation.

Figure 2:
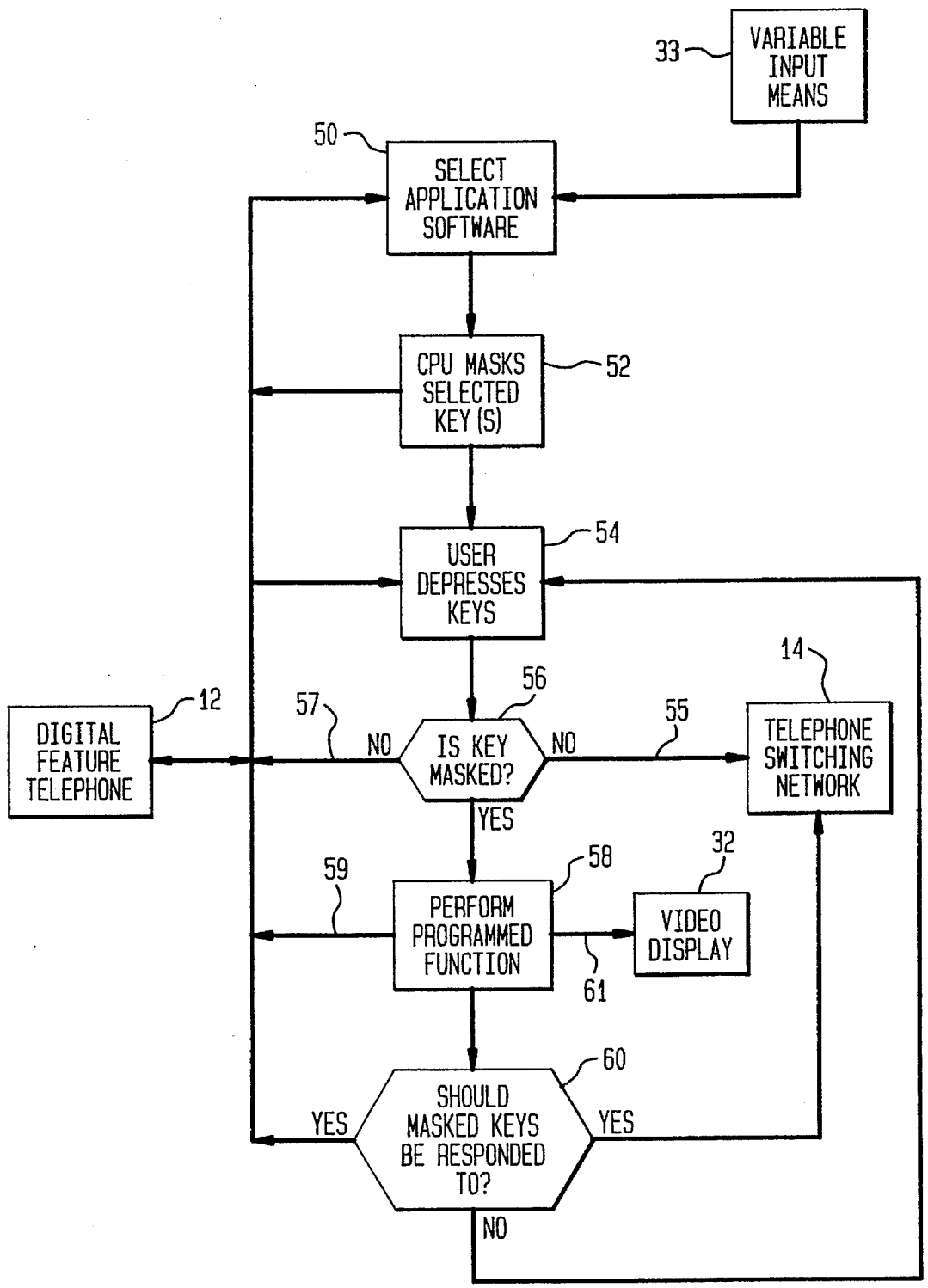
FIG. 2 is a logic diagram detailing the method of operation for the present invention telephone control interface system.

In FIG. 2, a block diagram is shown illustrating the interactions of the digital telephone control interface system with DFT 12 and telephone switching network 14. Referring to FIG. 2 in conjunction with FIG. 1, it can be seen that the first step in the operation is to select the desired application software 34, as shown by box 50. In the preferred embodiment, wherein CPU 16 is a personal computer the appropriate application program is selected by loading a desired application software into the personal computer or retrieving the desired application program from the memory of the personal computer. The loading of a desired software program into a personal computer is well known in the art and is readily accomplished through the use of the variable input means 33, which may be the computer keyboard, mouse or the like If CPU 16 was not embodied as a personal computer, but rather was directly formed into the circuitry of DFT 12, it should be understood that the desired application software 34 could be selected and run by utilizing selected keypad keys 18, function keys 20 and/or specialized keys 21 on DFT 12. For example, by entering a predetermined sequence or code into keypad keys 18, function keys 20 and/or specialized keys 21, a desired application program could be recalled from an internal memory source and run by CPU 16. Furthermore, it should also be understood that the present invention digital telephone control interface system 10 may be configured to utilize only one application software program which is automatically run by CPU 16 when CPU 16 is enabled.

As indicated in FIG. 2 by box 52, upon the selection of the desired application 34, CPU 16 masks selected keypad keys 18, function keys 20 and specialized keys 21 on DFT 12. The CPU controlled masking of a key can be accomplished in any known manner. However, in the preferred embodiment, CPU 16 masks the various keys of DFT 12 by creating a binary field where each binary digit in the binary field corresponds to one of keys present on DFT 12. As such, the number of binary digits in the binary field match or exceed the total number of keys on DFT 12. Nominally, all the binary digits within the binary field are set at (0). However, as the application software 34 determines that a specified key is to be masked, the binary digit corresponding to that specified key is set at one (1). The structure of this masking command, as formed by CPU 16, may be as shown below:

| BYTE # | BINARY VALUE | KEY MASKED/ LED CONTROLLED |
|--------|--------------|----------------------------|
| 1      | 0000 0001    | 1                          |
| 1      | 0000 0010    | 2                          |
| 1      | 0000 0011    | 1 and 2                    |
| .      | .            |                            |
| .      | .            |                            |
| N      | XXXX XXXX    | Enough bytes to cover all phone keys |

The binary field created by CPU 16 is directed to the telephone control circuitry 28 of DFT 12 where it acts as a masking command. DFT 12 then executes the masking command, masking selected keypad keys 18, function keys 20 and/or specialized keys 21 contained within the masking command that have a binary value of one (1). It should be understood that although the above binary value approach to masking DFT keypad keys 18, function keys 20 and specialized keys 21, is preferred, other codes and operations can be employed.

Once the appropriate application software 34 has been selected and the masking command has been read to DFT 12, a user can begin to use the DFT 12 to perform a desired task, as indicated by box 54. As the user utilizes keypad keys 18, function keys 20 and specialized keys 21, key events result. As indicated by box 56, if a key event corresponds to a key that has not been masked the key event is either directly forwarded to the telephone switching network 14 (as indicated by line 55) or the key event is directly acted upon by the telephone control circuitry 28 of DFT 12 (as indicated by line 57). Consequently, if a key is not masked the key event from the unmasked key is acted upon in a conventional manner. However, as shown by box 58, if a user depresses a key on DFT 12 that has been masked by CPU 16, the CPU 16 receives the masked key event and responds to the key event according to the running application software 34.

The operations performed by CPU 16 in response to a received masked key event are controlled by the application software 34 being run by CPU 16. Depending upon the application software 34 selected, the CPU 16 may suppress, enhance, alter or delay the key event entered. Additionally, CPU 16 may interact with the user of the DFT 12 by selectively controlling the LEDs 22 and LCD 24 on the DFT 12 (as indicated by line 59) or providing visual information to the user, via the video monitor 32 (as indicated by line 61). For example, if application software 34 were selected to assist a novice user in learning to properly operate a complicated telephone system, the application software 34 may mask all the keys available on DFT 12. The CPU 16 may then begin to instruct the user in how to properly operate the different functions available on DFT 12. The CPU 16 may generate instructions and/or graphical illustrations on the video monitor 32, which may instruct a user in how to utilize the keypad keys 18, function keys 20 and specialized keys 21. In addition to the information set forth on the video monitor 32, the CPU 16 may provide messages to be displayed on the LCD 24. Furthermore, CPU 16 may selectively control the LEDs 22 that correspond to the masked keys. The CPU 16 may create any desired blinking sequence in the LEDs 22 it controls. As such, CPU 16 may selectively energize or blink the LEDs 22 to help a user locate any key associated with an LED 22.

By selectively masking the keys, CPU 16 intercepts a given key event before that key event is responded to by the telephone switching network 14 or the telephone control circuitry 28. As such, CPU 16 may suppress a received key event, enhance the key event, alter the key event or delay the key event until selective criteria occur. For instance, if application software 34 were chosen to help a novice user learn the features of a given telephone system, CPU 16 may mask all the keys on DFT 12. As the user began using DFT 12, CPU 16 may interact with the user, via the video monitor 32, LEDs 22 and/or LCD 24, to instruct the user as to which keys must be used to accomplish a desired function. If the user were to accidentally depress a wrong key, CPU 16 can suppress the resulting key event, inform the user as to his error and instruct the user as to which key on DFT 12 is proper. If a user depressed a proper key, CPU 16 may so inform the user and forward the key event to either the telephone switching network 14 or the telephone control circuitry 28, wherein the key event could be acted upon in a conventional manner. Furthermore, if a user were entering a large sequence of key events into DFT 12, such as a telephone number or security code number, CPU 16 may delay the key events by storing the key event sequence in memory. After the user has completed the desired key event sequence, CPU 16 may display the sequence to the user on the video monitor 32 and/or LCD 24. This provides the user the opportunity to change the key event sequence before it is forwarded to the telephone switching exchange 14. As such, the present invention digital telephone control interface system 10 can be used to prevent wrongful key events from being reacted to by the telephone control circuitry 28 or telephone switching network 14, thereby preventing the accidental misuse of DFT 12 and unnecessary loading of telephone switching network 14.

In addition to suppressing and/or delaying masked key events received by CPU 16, CPU 16 may also enhance or alter the key events received. For example, CPU 16 may provide a complex string of key events in response to a single received key event, thereby allowing large key event sequences, such as telephone numbers or the like to be generated by the depression of a single key. Another powerful application of the present invention digital telephone control interface system 10 is one wherein CPU 16, as directed by application software 34, alters or expands upon the key events entered by the user in a new manner. For instance, the user could run an application program 34 that allows the user to dial by name rather than by phone number, utilizing the letters conventionally found on the keypad keys 18 of a DFT 12. CPU 16 can mask the keypad keys 18 and match the letters entered to telephone numbers stored within the memory of CPU 16. CPU 16 can then generate the proper key event sequence to dial the desired individual. When applied to a telephone system contained within a single company, a user can dial any person merely by dialing the person's name. As such, a user does not have to remember or reference a person's telephone number in order to dial the person.

As is shown by box 60 in FIG. 2, once CPU 16 under the direction of application program 34 has performed its programmed operation regarding key event and/or interacting with the user, the CPU 16 determines whether or not the key event should be responded to by the telephone control circuitry 28 or forwarded to telephone switching network 14. This prevents wrongful key events from being responded to by either DFT 12 or telephone switching network 14, thereby reducing the loading on each.

For example, if the application software 34 were selected that was purely demonstrative and is used purely to train unskilled operators, the key events created by the operator would not be responded by DFT 12 or forwarded to telephone switching network 12. Rather, the key events created by the operator would be received only by CPU 16 where CPU 16 could respond to the key events and assist the operator in learning the telephone system. As such, both the telephone control circuitry 28 of DFT 12 and the telephone switching network 14 would remain unaffected. However, if the application software 34 were instructional, teaching an operator about a desired function as the operator actually performed desired function, the application software 34 may mask the key entries entered by the operator, check the accuracy of those key entries and finally cause DFT 12 to respond to the key events or forward those key events to the telephone switching network 14 so as to actually produce the desired function.

The present invention telephone control interface system 10 can be applied to any application where it is desired to assist, direct, confirm or alter an operator's use of a DFT 12 before the operator's actions are actually responded to by DFT 12 or forwarded to telephone switching network 14. For example, the present invention telephone control interface system 10 can be used to confirm that a proper telephone number, security code number or the like has been properly dialed, by masking the dialed entry until the dialed entry is confirmed by the operator, at which time that dialed entry can be responded to by the telephone 12 or forwarded to the telephone switching network 14 with confidence.

By having the key events of a telephone and the connection between a telephone and a telephone switching network controlled by a programmable CPU, desired programs can be run by the CPU, so as to provide a desired response to predetermined uses or misuses of the telephone by an operator. In view of the versatility of CPU programming, it should be understood that a person skilled in the art may display any interactive programs for the CPU without departing from the spirit and scope of the invention. The present invention telephone control interface system is a computer controlled system that acts as an intermediary in the coupling of a telephone's keypad to the telephone and the interconnection of the telephone to a switching network. As such, the present invention telephone control interface system can be programmed to instruct, assist, confirm or alter the key events generated by an operator in properly utilizing most any digital feature telephone. All variations and modifications to the present invention, achievable by a person skilled in the art, are intended to be included within the scope of the invention as defined by the appended claims.

What is claimed is:

1. In a telephone system having at least one telephone with multiple keys, wherein said telephone is coupled to both a telephone switching network and a programmable control, an interface control system comprising:

a masking means within said programmable control for selectively masking said keys after they are pressed for preventing key telephony events produced by said keys masked from being responded to by either said telephone or said telephone switching network, a modifying means within said programmable control for analyzing a function to be invoked by the key presses in a context related manner and for causing he function to be carried out as directed by said programmable control; and indication means controlled by said programmable control, for instructionally assisting a user as to proper operation of said keys to implement a desired key telephony event.

2. The system according to claim 1, wherein said modifying means within said programmable control comprises means for selectively modifying key press events from masked keys after they are pressed in a context related manner for altering said key press events entered by a user on said telephone before said key press events are responded to by said telephone or said telephone switching network.

3. The system according to claim 1, further including a visual display means for visually displaying said variable indication to said user.

4. The system according to claim 3, wherein said visual display means includes a video monitor for displaying said variable indication.

5. The system according to claim 3, wherein said visual display means includes light emitting diodes formed on said telephone.

6. The system according to claim 3, wherein said visual display means includes a liquid crystal display formed on said telephone.

7. The system according to claim 1, wherein said programmable control is a computer joined to said telephone by a communications link capable of transmitting digital data between said computer and said telephone.

8. The system according to claim 1, wherein said programmable control is coupled to said indication means and to said keys, said indication means providing instructions to the user to enable the user to implement a desired function associated with a particular key, and said programmable control means masks keys other than said particular key such that if any of said other keys are pressed, the key telephony events produced by said other keys are not implemented and said indication means instructs the user that said other key pressed is an improper key for said desired function.

9. A computer control system for selectively controlling the response of a digital feature telephone to key activation signals created by the depression of keys on said telephone and controlling the routing of said key activation signals to a telephone switching network, comprising:

a programmable control means coupled to said telephone and said telephone switching network, said programmable control means including a masking means for selectively masking said key activation after said keys are pressed to prevent said telephone from directly responding to said key activation signals and to prevent said key activation signals from being directly received by said telephone switching network and a modifying means within said programmable control for analyzing a function to be invoked by the keys in a context related manner and for causing the function to be carried out as directed by said programmable control means;

said programmable control means including means for interacting with a user of said telephone to produce variable indications to the user for assisting the user in a desired operation of said telephone, and wherein said programmable control means, in conjunction with said masking means, enables the user to implement a desired function associated with a particular key by instructing the user via a first of said variable indications as to the particular key that must be pressed to implement said desired function, and by masking said key activation signals created by the depression of keys other than said particular key, such that if the user presses said particular key, said desired operation is implemented, and if the user presses one of said other keys, said desired operation is not implemented and the user is instructed via a second of said variable indications that the pressing of said one of said other keys is improper for the desired function.

10. The system according to claim 9, wherein said modifying means comprises means for selectively modifying said key activation signals received by masked keys in a context sensitive manner for altering said key activation signals before said key activation signals are responded to by said telephone or said telephone switching network.

11. The system according to claim 9, wherein said means for interacting includes a visual display means controlled by said programmable control means wherein said variable indication can be visually displayed to said user.

12. The computer control system according to claim 9 wherein said means for interacting with said user is for demonstrative training of the user in the proper operation of the telephone, such that upon the user pressing said particular key, the user is instructed that said pressing of said particular key is proper and said desired function is not implemented, whereby said key activation signals generated by the pressing of said particular key are prevented from being received by said telephone switching network while the user is assisted in learning the operation of said telephone.

13. In a telephone system having at least one telephone with multiple keys, wherein said telephone is coupled to both a telephone switching network and a computer control means, a method of selectively controlling key events produced by said keys on said telephone comprising the steps of:

selectively masking said keys on said telephone with said computer control after said keys are pressed and preventing said key events generated from masked keys from being responded to by said telephone or said telephone switching network, analyzing a function to be invoked by the key presses in a context related manner, and causing the function to be carried out as directed by said computer control means.

14. The method according to claim 13, further including the steps of selectively modifying said key events received from masked keys after they are pressed in a context related manner for altering said key activation signals before said key events are directed to said telephone or said telephone switching network by said computer control means.

15. The method according to claim 13, further including the step of creating a variable response directed to a user of said telephone, assisting said user in performing a desired task on said telephone, and wherein said variable response is controlled by said computer control means.

16. The method according to claim 15, wherein said step of creating a variable response includes creating a visual display in a display device coupled to said computer control means.

17. The method according to claim 13, wherein said step of selectively masking said keys on said telephone includes assigning a binary digit to each of said keys, said binary digit changing from a set value of zero to a set value of one as said computer control means masks a given key, said computer control means thereby controlling the routing of said keys having a binary digit value of one to said telephone and said telephone exchange network.

18. The method according to claim 17, further including the step of allowing said telephone and said telephone switching network to directly respond to key events generated from keys on said telephone not masked by said computer control means.

19. The method according to claim 15, wherein said step of creating a variable response includes selectively lighting light emitting diodes present on said telephone.

20. The method according to claim 14, wherein said step of selectively modifying said key events includes enhancing said key events with supplemental key events as directed by said computer control means.

* * * * *